S. RUE.

Injectors for Steam-Generators.

No. 6,006. Reissued Aug. 11, 1874.

Witnesses

L. F. Brois.

A. P. Grant.

Inventor

Samuel Rue.

by John A. Wiedersheim.

Atty.

THE GRAPHIC CO. PHOTO-LITH. 39 & 41 PARK PLACE, N.Y.

UNITED STATES PATENT OFFICE.

SAMUEL RUE, OF PHILADELPHIA, PENNSYLVANIA, ASSIGNOR, BY MESNE ASSIGNMENTS, TO HIMSELF, SAMUEL McCAMBRIDGE, STERLING BONSALL, AND EDWARD G. MARTIN, (CECELIA MARTIN, ADMINISTRATRIX OF EDWARD G. MARTIN, DECEASED.)

IMPROVEMENT IN INJECTORS FOR STEAM-GENERATORS.

Specification forming part of Letters Patent No. 81,822, dated September 1, 1868; reissue No. 6,006, dated August 11, 1874; application filed June 13, 1874.

*To all whom it may concern:*

Be it known that I, SAMUEL RUE, of the city and county of Philadelphia, and the State of Pennsylvania, have invented a new and useful Improvement in Injectors for Steam-Generators; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
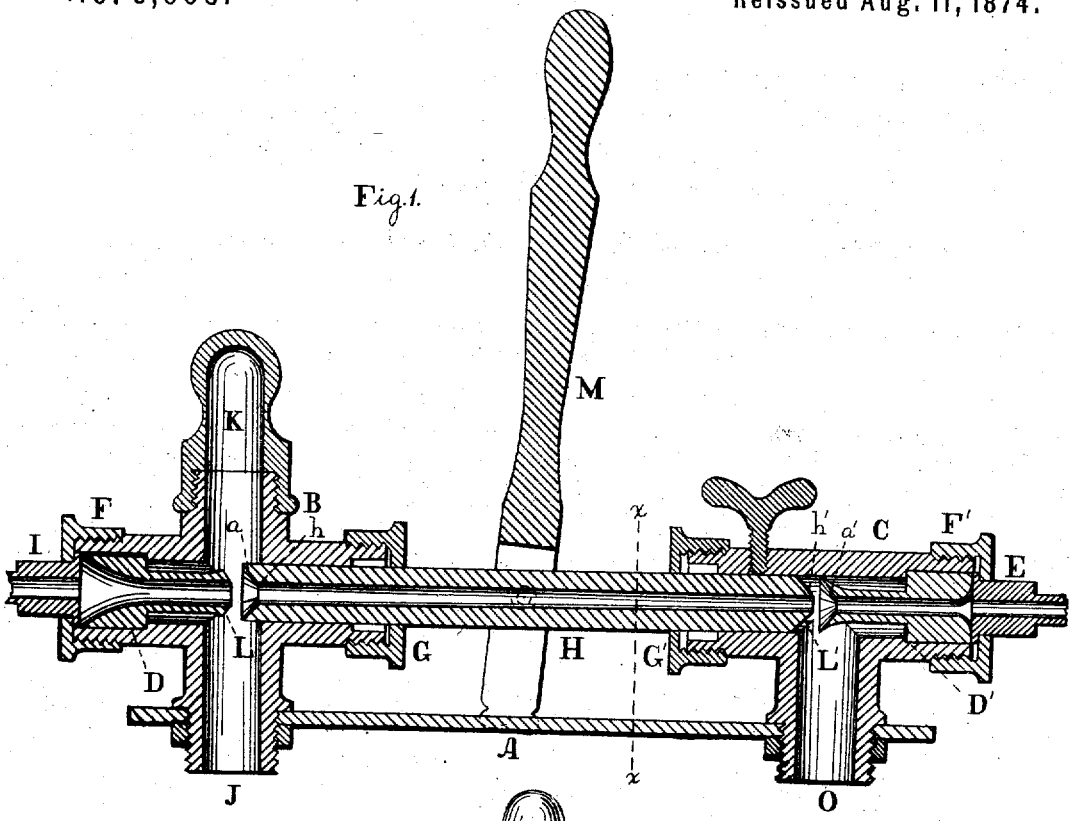
Figure 2:
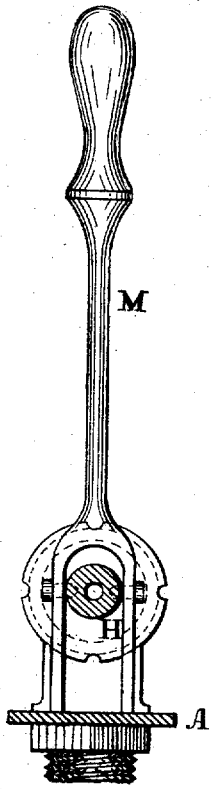

Figure 1 is a central longitudinal vertical section of the device embodying my invention. Fig. 2 is a transverse section in line *x x*, Fig. 1.

Similar letters of reference indicate corresponding parts in the two figures.

My invention consists in the construction of an injector with valves and valve-seats formed on the ends of hollow plugs which are combined with the steam-pipe at one end, and discharge-pipe leading to the boiler at the other end, and on the ends of an intermediate adjustable tube, which is placed in line with and works between said plugs, in this form doing away with the nozzles projecting into the intermediate tube, the injector working when the steam-tube and combining-tube are some distance apart. It also consists in the construction of an injector in which the hollow plug which forms the steam-delivery tube and the hollow plug which forms the delivery-tube to the boiler are placed in chambers which are attached to a bed-plate at opposite ends thereof, and an intermediate tube placed between and extending from near the ends of these plugs and adjusting thereto, with valves and valve-seats formed on the ends of these plugs and the intermediate tube, these plugs and tube forming a steam-delivery tube, a combining-tube, and a delivery-tube to the boiler, the chamber wherein are the steam-delivery tube and receiving end of the adjustable tube having an attachment to a water-supply pipe, and forming a water-chamber, and the chamber wherein are the discharging end of the adjustable tube and the delivery-tube leading to the boiler having an opening for an overflow, and forming an overflow-chamber. It also consists of an intermediate adjustable tube, which is made with a taper bore from the front end, where it receives the water, to the rear end, where it discharges, and which bore, at its front end, is smaller than the bore of the adjacent end of the steam-tube, whereby a greater pressure of steam is obtained than when the steam-tube penetrates the combining-tube, thus giving a greater force at the point where the water and steam first come together at the mouth of the combining-tube, which force is increased by the taper of the tube; and in this form of injector the combining-tube is made longer than heretofore used, and the taper is proportioned to the length of the tube and the amount of water required to be thrown. It also consists in making the bore of the steam-plug larger than the bore of the mouth of the adjacent tube, in which the steam and water are combined. It further consists in the construction of the bore of said intermediate adjustable tube with a taper diminishing from its receiving end to its discharging end, which, by increasing the pressure and velocity of the water, overcomes the resistance of the check-valve between the injector and boiler. It also consists in the adjustment of the intermediate tube to suit the requirements of variation of pressure of steam and water. It also consists in the arrangement of castings with a bed-plate and intermediate tube, whereby said tube is outside of any casing through part of its length. It also consists in an air and water chamber with the injector to commence the supply of water to the injector.

Referring to the drawings, A represents the bed-plate, with one end of which is connected the casting B, and with the other end the casting C. The casting B has in its front end the hollow plug D, which is connected with the steam-pipe I by means of the coupling F. This coupling also holds the said plug firmly in connection with the casting B. Said casting has also a branch, J, to which the feed-water pipe is attached. The casting C has at its extreme end the hollow plug D′, with which is connected the discharge-pipe E, which leads to the boiler by means of the coupling F′ and an overflow-branch, O. Stuffing-boxes G and G′ are provided to the castings B and C, through which the tube H passes. The intermediate adjustable tube H is made with a taper bore, diminishing from *h* to *h*′, and is made in length to extend from about the middle of the casting B to the middle of the casting C, leaving a short distance between the ends of it and the ends of the plugs D and D′, working through and sustained by the stuffing-boxes G and G′, and is operated by the lever M to regulate the flow of water, and either opening or closing the valve at either end of the tube. On the inner end of the plug D is a valve, L, which has its seat *a* in the adjacent end of the adjustable tube H. On the discharging end of the adjustable tube H is a valve, L′, which has its seat *a*′ on the adjacent end of the plug D′. I make the bore of the plug D of a larger diameter than that of the mouth *h* of the tube H, so as to increase the pressure on the water as it enters the tube H, and this pressure, forcing the water through the diminished taper, gives it an increased velocity and force, which may be varied by the length of the tube and proportionate taper. The plugs D and D′, as well as the adjustable tube H, are removable, so as to provide for supplying their places with other pieces of an increased or diminished bore, as may be required in altering the capacity of the injector without changing the other parts, and also for renewal when worn out.

When water is first let into the injector from the feed-pipe, as before stated, it rushes into the chamber K opposite to the feed-pipe, the air in said chamber forming a cushion to the water, and preventing a sudden jar. The air and water contained in said chamber afterward, in starting the injector, commence their action, the air forcing the water into the pipe H, and thereby facilitating the flow from the feed-pipe.

It will be observed that from the arrangement of the chambers B and C and adjustable tube H the greater portion of the tube H is outside of any casing, and can be attached to for the purpose of moving it.

Having thus described my invention, what I claim as new, and desire to secure by Letters Patent, is—

1. The plugs D and D′ and intermediate tube H, adjustable with reference to each other, and provided with the valves L and L′ and the valve-seats *a* and *a*′, substantially as and for the purpose set forth.

2. The bed-plate A, with castings B and C at the ends thereof, the plugs D and D′, the feed-branch J, the overflow-branch O, and the adjustable tube H intermediate of the castings B and C, the whole combined and forming an improvement in injectors, for the purpose set forth.

3. The adjustable tube H, having its bore made smaller at its receiving end *h* than the bore of adjacent end of the steam-plug D, whereby to increase the pressure of the water through the tube H, substantially as described.

4. The steam-plug having a larger bore than the bore of the adjacent end of the tube H, substantially as and for the purpose set forth.

5. The tapering bore of the tube H, diminishing from its receiving end *h* to its discharging end *h*′, substantially as and for the purpose set forth.

6. In combination with the plugs D D′, the tube H, working between the plugs and operated by the handle M, substantially as set forth.

7. The castings B and C, bed-plate A, and tube H, combined and arranged in relation to each other as shown, whereby the tube H is outside of any casing through part of its length, substantially as and for the purpose set forth.

8. The combination of the air and water chamber K with the injector opposite the feed-pipe, whereby to facilitate the supply of water to the injector at the commencing of its flow, substantially as described.

SAMUEL RUE.

Witnesses:
JOHN A. WIEDERSHEIM,
CHARLES ELLIS.